| | | |
|---|---|---|
| (12) | United States Patent<br>Wieland et al. | (10) Patent No.: US 9,187,015 B2<br>(45) Date of Patent: Nov. 17, 2015 |

(54) ARMREST UNIT FOR A PASSENGER SEAT

(75) Inventors: Klaus Wieland, Bibersfeld (DE); Bernd Sommer, Schwäbisch Hall (DE)

(73) Assignee: RECARO Aircraft Seating GmbH & Co. KG, Schwäbisch Hall (DE)

( * ) Notice: Subject to any disclaimer, the term of this patent is extended or adjusted under 35 U.S.C. 154(b) by 146 days.

(21) Appl. No.: 13/259,569

(22) PCT Filed: Mar. 26, 2010

(86) PCT No.: PCT/EP2010/001912
§ 371 (c)(1),
(2), (4) Date: Dec. 6, 2011

(87) PCT Pub. No.: WO2010/108690
PCT Pub. Date: Sep. 30, 2010

(65) Prior Publication Data
US 2012/0068518 A1    Mar. 22, 2012

(30) Foreign Application Priority Data

Mar. 27, 2009  (DE) .......................... 10 2009 014 750

(51) Int. Cl.
*A47C 7/54* (2006.01)
*B60N 2/46* (2006.01)

(52) U.S. Cl.
CPC ......................................... *B60N 2/46* (2013.01)

(58) Field of Classification Search
USPC ........................................ 297/411.2, 411.46
See application file for complete search history.

(56) References Cited

U.S. PATENT DOCUMENTS

| | | | | |
|---|---|---|---|---|
| 2,318,841 | A | * | 5/1943 | Dodge ........................... 248/118 |
| 4,331,360 | A | * | 5/1982 | Roudybush et al. ...... 297/411.45 |
| 4,597,606 | A | * | 7/1986 | Magee ...................... 297/411.46 |
| 5,009,468 | A | | 4/1991 | Fomby |
| 5,395,161 | A | * | 3/1995 | Spykerman et al. ........ 297/411.2 |
| 5,407,156 | A | * | 4/1995 | Rossman et al. ........... 248/118.1 |
| 7,862,122 | B1 | * | 1/2011 | Shammas ................ 297/411.23 |
| 2004/0167447 | A1 | * | 8/2004 | Johnson, III ...................... 602/5 |

FOREIGN PATENT DOCUMENTS

| | | |
|---|---|---|
| DE | 19 49 303 A1 | 4/1971 |
| DE | 297 09 958 U1 | 8/1997 |
| DE | 29709958 U1 | 9/1997 |
| DE | 202 070 285 U1 | 9/2003 |
| DE | 10 2005 006 977 A1 | 8/2006 |
| EP | 0 187 346 | 7/1986 |
| EP | 0187346 A2 | 7/1986 |
| EP | 05 29 671 A2 | 3/1993 |

(Continued)

OTHER PUBLICATIONS

International Search Report mailed on Aug. 5, 2010 for the corresponding International patent application No. PCT/EP2010/001912 (English copy enclosed).

(Continued)

*Primary Examiner* — Sarah B McPartlin
(74) *Attorney, Agent, or Firm* — Posz Law Group, PLC (57) ABSTRACT

An armrest unit for a passenger seat includes an armrest base body forming an armrest surface, and a suspension unit which is disposed underneath the armrest surface and which has at least one spacing means.

18 Claims, 6 Drawing Sheets

(56) References Cited

FOREIGN PATENT DOCUMENTS

| EP | 06 69 221 A1 | 8/1995 |
|---|---|---|
| JP | A-2004-345566 | 12/2004 |
| JP | 2005-073786 A | 3/2005 |

OTHER PUBLICATIONS

German Search Report mailed on Mar. 23, 2010 for the corresponding German patent application No. 10 2009 014 750.0 (German language report enclosed).

German Search Report issued on Mar. 23, 2010 in corresponding DE application No. 10 2009 0147500. (Partial English translation).

International Preliminary Report on Patentability issued on Sep. 27, 2011 in related PCT application No. PCT/EP2010/001912. (English).

International Search Report mailed on May 8, 2010 in related PCT application No. PCT/EP2010/001912. (English).

Written Opinion of the International Searching Authority mailed on May 8, 2010 in related PCT application No. PCT/EP2010/001912. (English).

Office Action mailed Feb. 18, 2014 in corresponding JP Application No. 2012-501191. (English Translation).

Office Action issued by EPO on May 29, 2015 in the corresponding EP application No. 10 716 281.0 (Partial translation attached).

* cited by examiner

ARMREST UNIT FOR A PASSENGER SEAT

CROSS REFERENCE TO RELATED APPLICATIONS

This application is a U.S. national stage application of PCT/EP2010/001912 filed on Mar. 26, 2010, and claims priority to, and incorporates by reference, German patent application No. 10 2009 014 750.0 filed on Mar. 27, 2009.

BACKGROUND

The invention is based on an armrest unit for a passenger seat comprising an armrest base body which forms an armrest surface.

A passenger seat comprising an armrest is already known. Said armrest comprises an armrest base body which forms an armrest surface for supporting an arm of a seated passenger. The armrest base body consists of a material which has a hardness adapted to wear protection.

The object of the invention is to provide a generic armrest unit for a passenger seat, which provides a high degree of comfort for a passenger and yet offers advantageous wear protection.

The object is achieved according to the invention by the features of claim 1, whilst advantageous embodiments and developments of the invention may be derived from the subclaims.

SUMMARY

The invention is based on an armrest unit for a passenger seat comprising an armrest base body which forms an armrest surface.

It is proposed that the armrest unit for a passenger seat comprises a suspension unit which is arranged underneath the armrest surface and which has at least one spacing means. As a result, the comfort for a seated passenger may be increased, wherein a material adapted to wear protection may be retained for producing the armrest base body.

In a position of use, the armrest surface advantageously forms a support for an arm of a passenger when a passenger seat is used in standard manner and, in this case, is provided for absorbing supporting forces which are oriented substantially vertically relative to a floor on which the passenger seat is mounted. In at least one position of use of an armrest in which the armrest unit for a passenger seat is integrated, the armrest surface is oriented at least substantially horizontally relative to the floor. Preferably, lateral surfaces adjoin the armrest surface which, relative to a vertical direction, are arranged perpendicular to the floor and proceeding from the armrest surface are inclined downwards and optionally vertically, wherein the armrest surface constitutes a main surface of the armrest base body, i.e. a substantial part of the entire external surface formed by the armrest base body.

The term "underneath" in this case refers to the normal direction of the armrest surface. The armrest surface represents the "uppermost" region of the armrest unit for a passenger seat, wherein a direction opposing the normal direction faces "downward". In a position of use of the armrest surface, the normal direction relative to the armrest surface is preferably oriented at least substantially vertically relative to the floor. In a position of use, the forces which the armrest surface is subjected to during use are typically oriented substantially counter to the normal direction. By an arrangement of the suspension unit underneath the armrest surface, the comfort for a passenger may be accordingly increased by the armrest surface having an increased flexibility in a direction opposing the normal direction.

"Spacing means" is intended to be understood, in particular, as a means which for forming a space between two components is supported on supporting surfaces formed by the components and opposing one another, wherein, in contrast to a continuous filling material which merely fills up a volume formed by the space, in at least one direction at least one discrete supporting region of at least one of the supporting surfaces is allocated to the spacing means. "Supporting region" is intended, in particular, to be understood as a region of the supporting surface, in which the spacing means is adjacent to the supporting surface. "Discrete supporting region of a supporting surface in at least one direction" is intended to mean, in particular, that the supporting region has in this direction an extent which corresponds, to a maximum degree, to a fraction of the maximum extent of the supporting surface in this direction. In particular, the extent of the discrete supporting region is no greater than a fifth, advantageously no greater than a tenth of the entire extent of the supporting surface in the relevant direction. Particularly advantageously, a sensation of stability may be imparted to a passenger when an arm is supported on the armrest surface, if the suspension unit has a plurality of spacing means. In this case, the spacing means may be distinguished from one another, in contrast to a continuous filling material. In this case, a corresponding supporting surface has a plurality of discrete supporting regions for supporting the spacing means, which are spaced apart from one another in at least one direction. The armrest unit for a passenger seat preferably has a supporting means for supporting the suspension unit, wherein the spacing means forms, in the normal direction of the armrest surface, a space between the supporting means and at least one partial region of the armrest base body. The supporting means preferably forms a supporting surface which in a mounted state faces the armrest base body. In particular, the supporting surface is covered by the armrest surface relative to the normal direction, advantageously it may be oriented parallel to the armrest surface.

Moreover, a compact design and advantageous suspension may be achieved if the suspension unit is directly supported on at least one partial region of the armrest base body.

In a further advantageous embodiment of the invention, a high degree of flexibility may be achieved at a low weight if the armrest unit for a passenger seat has a supporting means for supporting the suspension unit, wherein at least one hollow space is formed between at least one partial region of the armrest base body and the supporting means by means of the suspension unit. In this case, "hollow space" is intended to be understood, in particular, as a space which is free from material. Particularly advantageously, the hollow space may be configured as an air cushion.

In this context, it is proposed that the suspension unit forms at least two hollow spaces and has a separating means which separates the hollow spaces from one another, whereby a high degree of flexibility may be achieved in different regions of the armrest base body. Typically, the flexibility of a conventional armrest base body is low, particularly in the region of its lateral surfaces. Herein an advantageously increased flexibility of the armrest base body may be achieved in at least one lateral region when the armrest base body is configured in an elongate manner with a longitudinal direction and has a central plane extending in the longitudinal direction, wherein the hollow space is arranged to the side of the central plane and spaced apart from the central plane. As a result, an advantageous arrangement may be easily achieved in which the hollow space is adjacent to a lateral region of the armrest base body, i.e. to a region constituting a lateral surface of the armrest base body. "Hollow space spaced apart from the central plane" is intended, in particular, to be understood in that a boundary defining the hollow space and facing the central plane is spaced apart from the central plane and namely, in particular, in a direction transversely to the central plane. The longitudinal direction preferably corresponds to the seating direction and/or the transport direction, such as for example a flight direction. In a structurally simple and material-saving embodiment, the separating means has at least two separating members which are arranged on both sides of the central plane. "Central plane" of the armrest base body is intended, in particular, to be understood as a plane which is oriented perpendicular to the armrest surface and parallel to the longitudinal direction, and which encloses the center of mass of the armrest base body.

Moreover, it is proposed that two hollow spaces are arranged on both sides of the central plane and spaced apart from the central plane. As a result, an advantageous arrangement may be achieved in a simple manner, in which the hollow spaces are adjacent to lateral regions of the armrest base body, which oppose one another relative to the central plane.

Moreover, a compact design may be advantageously achieved if the armrest base body at least substantially encloses the supporting means. In this case, the supporting means is "at least substantially enclosed" by the armrest base body, when at least three, in particular four, sides of the supporting means adjacent to one another in the respective normal directions of the sides are covered and/or overlapped by the armrest base body. Particularly advantageously, in this case, the armrest base body may be directly adjacent to the supporting means.

Advantageously, components for holding the armrest base body and/or the supporting means may be dispensed with when the armrest base body has at least one retaining region provided for effecting a retaining connection with the supporting means. In particular, in this case the armrest base body and the supporting means have shapes which are adapted and/or complementary to one another. A particularly simple assembly may be achieved in this context if the retaining region is provided for producing a form-fit connection with the supporting means.

In a further advantageous embodiment of the invention, it is proposed that the suspension unit has a suspension part comprising at least one partial region which is oriented obliquely relative to the supporting means, whereby a high degree of flexibility of the suspension unit may be achieved, in particular when forces caused by an arm being supported on the armrest surface act on the armrest surface in the direction of the supporting means. A partial region which is oriented "obliquely" relative to the supporting means is intended to be understood as a partial region which has at least one direction of extension, in particular, a direction of extension in a plane perpendicular to the longitudinal direction of the armrest base body, which forms an acute angle with a supporting surface formed by the supporting means. In particular, the partial region may adjoin the supporting means in an oblique manner. A further partial region may be adjoined to the partial region oriented obliquely relative to the supporting means, and which forms a bending point with the oblique partial region.

It is also proposed that the armrest base body is implemented in an elongate manner with a longitudinal direction, and the suspension unit comprises a suspension part which in the longitudinal direction has an extent which is at least a substantial part of the extent of the armrest base body in the longitudinal direction, wherein an at least substantially uniform suspension of the armrest surface in its longitudinal direction may be achieved, resulting in a pleasant haptic sensation for the passenger when resting on the armrest surface. "Substantial part" of the extent is intended, in particular, to be understood as at least 50%, preferably at least 70%, and particularly advantageously at least 80% of the entire extent of the armrest base body in its longitudinal direction.

A simple manufacture of the suspension unit and a simple mounting of the armrest unit for a passenger seat may be achieved when the suspension unit has at least one suspension part which is integrally formed onto the armrest base body.

Moreover, a structurally simple embodiment may be achieved if the suspension unit has at least one suspension part which has a region protruding from a partial region of the armrest base body, wherein a particularly advantageous, in particular direct, support of the armrest base body may be achieved by the suspension unit. In this embodiment, the protruding region may easily serve as a spacing means and/or separating means.

Moreover, a flexible and nevertheless stable support of the armrest base body may be achieved if the armrest base body is configured in an elongate manner with a longitudinal direction and the suspension unit has at least two regions parallel to one another oriented in the longitudinal direction, which protrude from a partial region of the armrest base body. In particular, a pair of portions may be arranged on both sides of a central plane of the armrest base body extending in the longitudinal direction. By a corresponding design, moreover, a plurality of hollow spaces separated and/or spaced apart from one another may be formed in a particularly structurally simple manner underneath the armrest surface. In order to achieve a high degree of flexibility in a pair of parallel portions, the portions may be aligned obliquely relative to the supporting means and/or obliquely relatively to one another.

In a further embodiment of the invention, it is proposed that the suspension unit has a resilient means which is made at least of fabric, whereby a light weight construction may be achieved.

In particular, it is proposed that the resilient means is configured as a spacer fabric, whereby a particularly advantageous suspension may be achieved with a flexibility which is uniform over a large area+. "Spacer fabric" is intended to be understood, in particular, as a pair of textile surfaces which are held apart from one another by means of a set of spacing means, in particular embodied as connecting threads, which connect the textile surfaces opposing one another. By means of a spacer fabric, in particular a high density of spacing means may be achieved, a particularly uniform suspension of the armrest surface may be achieved, in particular when the spacer fabric spans an area which at least substantially, namely in particular, corresponds to at least 50%, advantageously at least 70% and preferably at least 80% of the armrest surface.

In a preferred embodiment of the invention, it is proposed that the armrest base body is produced from a hard material, whereby a particularly high degree of protection against wear of the armrest surface may be achieved. "Hard material" is intended to be understood, in particular, as a material which has a hardness which, in particular, is greater than 50 Shore A, particularly advantageously greater than 70 Shore A.

BRIEF DESCRIPTION OF THE DRAWINGS

Further advantages are revealed from the following description of the drawings. In the drawings, exemplary embodiments of the invention are shown. The description and the claims contain numerous features in combination. A person skilled in the art will reasonably consider the features individually and combine them to make further expedient combinations.

In the drawings.

DETAILED DESCRIPTION OF THE PREFERRED EMBODIMENTS

Figure 1:
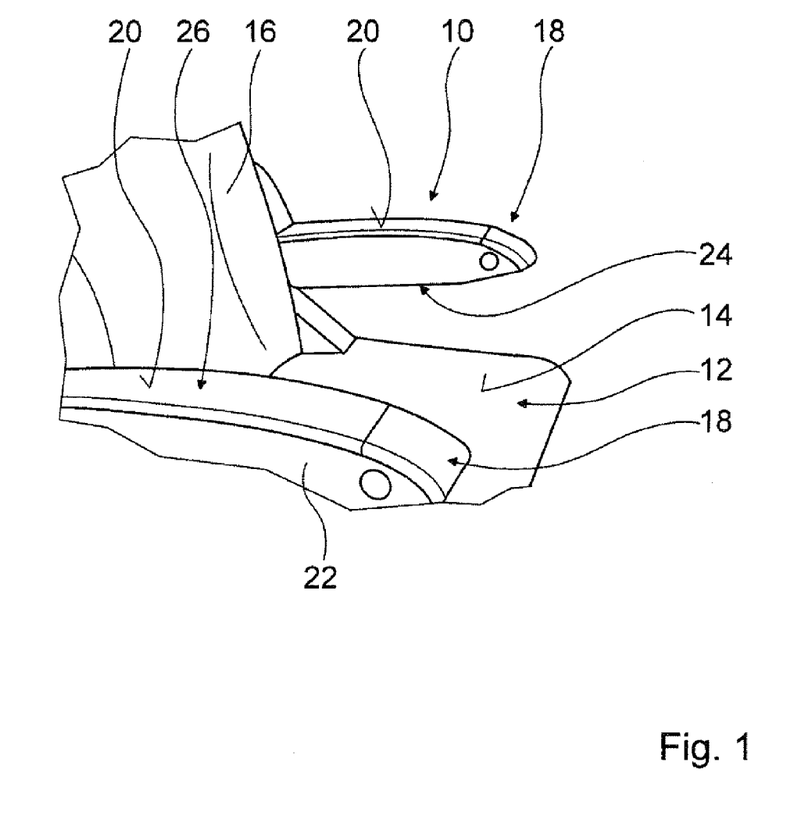
FIG. 1 is a perspective view of a passenger seat comprising armrest units.

FIG. 1 shows a passenger seat 10 configured as a flight passenger seat in a perspective view. Said passenger seat comprises a seat part 12, which forms a seat surface 14, and a backrest 16. On both sides of the backrest 16, two armrests 18 are arranged which in each case have an armrest surface 20 provided for supporting an arm of a passenger seated in the passenger seat 10. The armrests 18 may be rigidly connected to a seat structure or they may be pivotably mounted at the seat structure. In a horizontal position of the armrests 18 shown in FIG. 1, the corresponding armrest surface 20 is oriented substantially parallel to the seat surface 14 and/or to a floor on which the passenger seat 10 is mounted by means of a mounting unit not shown in detail.

The armrests 20 in each case have a shell body 22 which forms a bottom face 24 facing the seat surface 14 and opposing the armrest surface 20. One respective armrest unit 26 for a passenger seat is received in the upper region of the shell body 22 remote from the bottom face 24, and is described in more detail with reference to the following figures.

Figure 2:
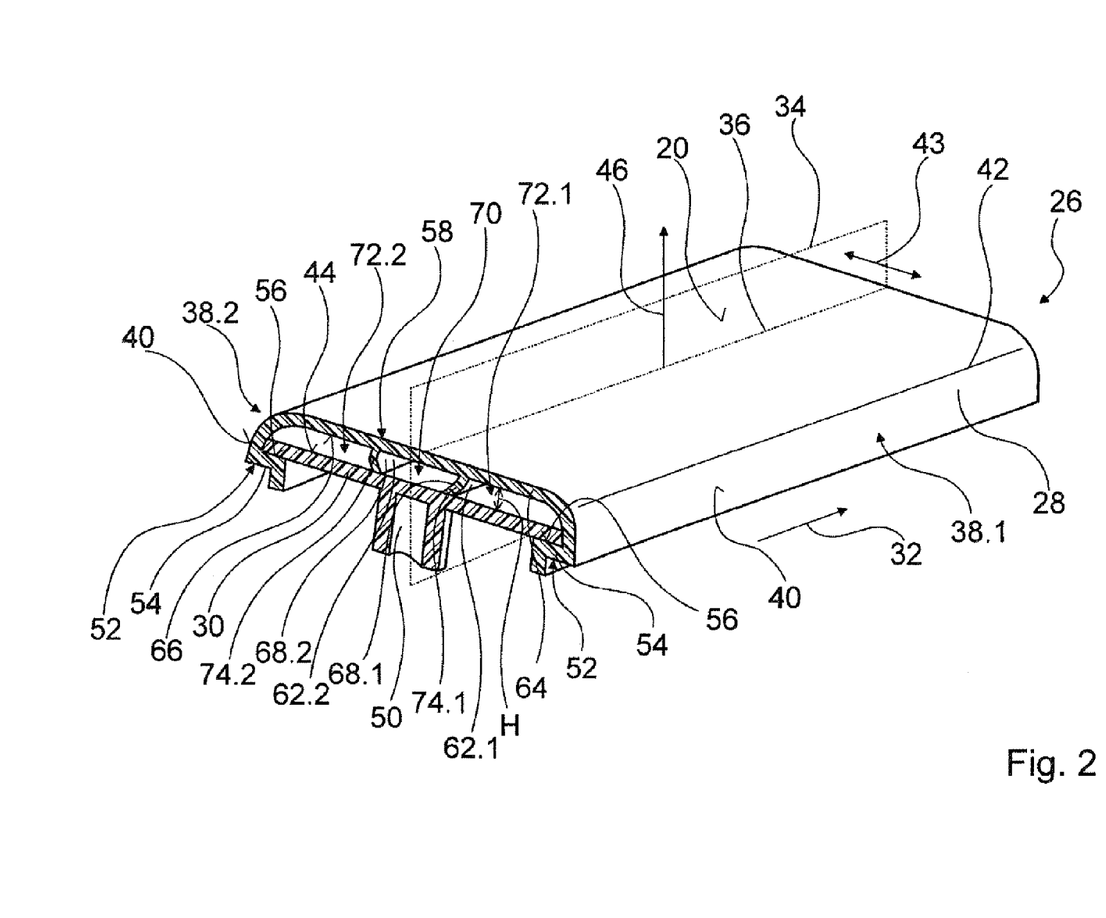
FIG. 2 is an armrest unit from FIG. 1 comprising a base body forming an armrest surface, a supporting means and a suspension unit arranged therebetween with spacing means.

FIG. 2 shows a three-dimensional sectional view of an armrest unit 26 for a passenger seat of FIG. 1. The following description also makes reference to FIGS. 3 and 4, which in each case show the armrest unit 26 for a passenger seat in an exploded view. As may be gathered from FIGS. 3 and 4, the armrest unit 26 for a passenger seat has an armrest base body 28 and a further component which is denoted as a supporting means 30 and is described in detail below.

With reference to FIG. 2, the armrest base body 28 has a main surface which in an installed state corresponds to the armrest surface 20. The armrest base body 28 is configured as an elongate component which has a main direction of extension and/or a longitudinal direction 32 which when installed in the passenger seat corresponds to the seating direction and/or the transport direction, for example a flight direction. Moreover, the armrest base body 28 may be imagined to be subdivided into two halves which are mirror-symmetrical relative to one another, with regard to a central plane 34 which is oriented parallel to the longitudinal direction 32 and perpendicular to the armrest surface 20. The path of the central plane 34 on the armrest surface 20 corresponds to a central axis 36 of the armrest base body 28. The armrest base body 28 further comprises two lateral regions 38.1, 38.2, which in each case form a lateral surface 40 which, over an edge region 42, in particular a rounded edge region 42, is adjacent to the main surface and/or the armrest surface 20. In particular, the lateral surface 40 integrally adjoins the armrest surface 20.

The lateral surfaces 40 are oriented parallel to the longitudinal direction 32 and are arranged opposing one another in a direction 43 perpendicular to the longitudinal direction 32.

Figure 3:
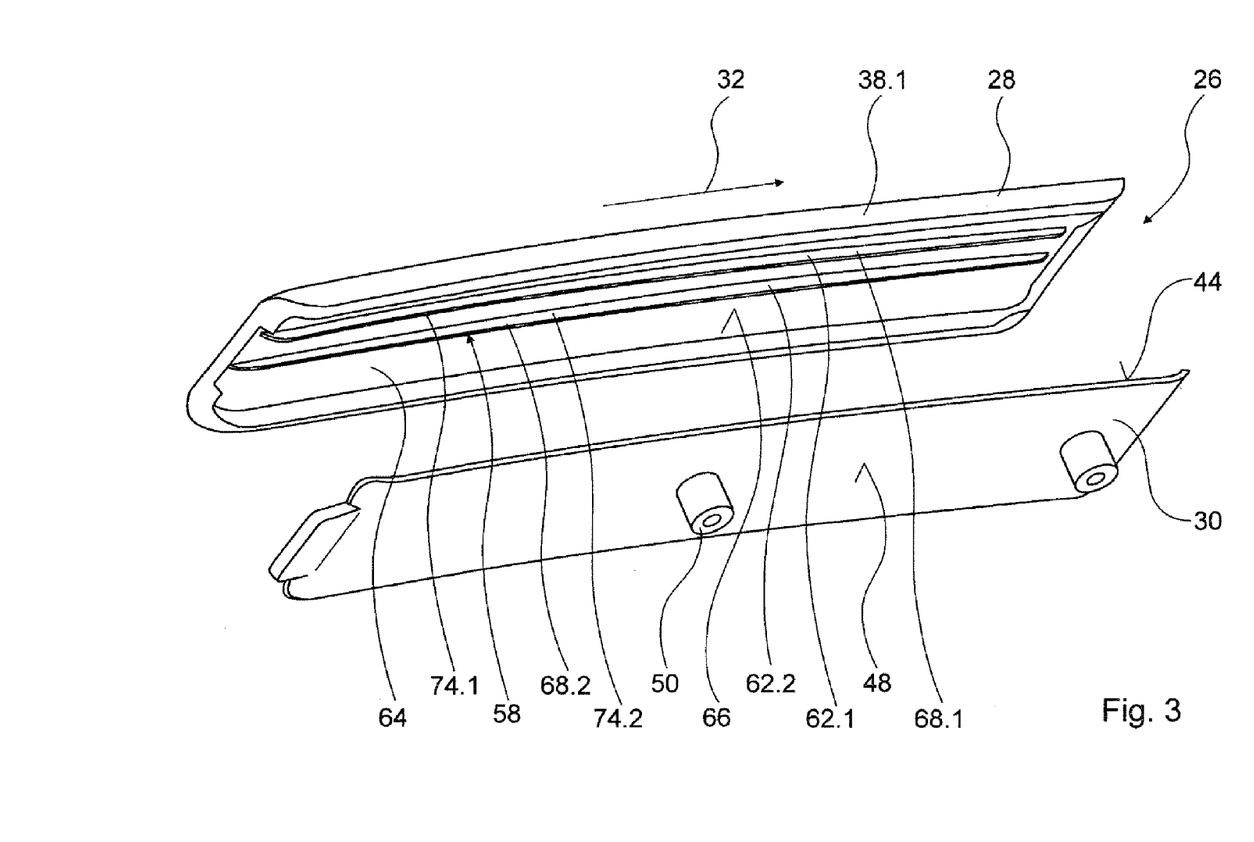
FIG. 3 is an exploded view of the armrest unit.
Figure 4:
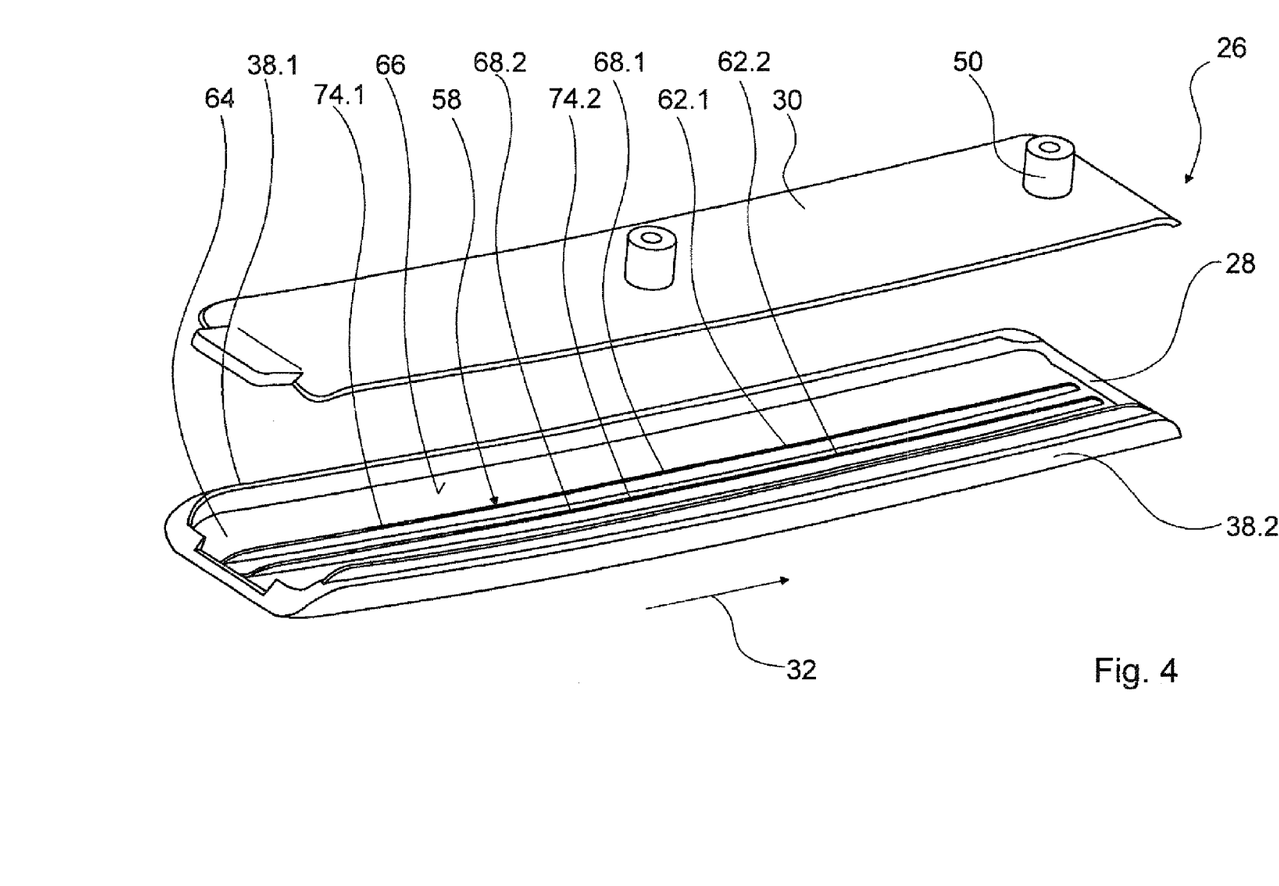
FIG. 4 is a further exploded view of the armrest unit.

The supporting means 30 is configured as a plate-shaped body (see FIGS. 3 and 4). It is also configured as an elongate component having a longitudinal direction which, in the installed state of the armrest unit 26 for a passenger seat, corresponds to the longitudinal direction 32 of the armrest base body 28. The supporting means 30 has a supporting surface 44 which in the installed state faces the armrest surface 20. The supporting surface 44 is, in this case, oriented substantially parallel to the armrest surface 20, and has a surface extent which corresponds at least to the surface extent of the armrest surface 20. Relative to the normal direction 46 of the armrest surface 20, the supporting surface 44 of the supporting means 30 is covered from the top by the armrest base body 28. The supporting means 30 further comprises a bottom surface 48 which, in the installed state, faces the shell body and onto which fastening means 50 are integrally formed for fastening the armrest unit for a passenger seat to further parts of the armrest 18. In the exemplary embodiment considered, the fastening means 50 are configured as screw receptacles which serve for producing a screw connection for fixing the armrest unit 26 for a passenger seat.

As may be seen in FIG. 2, the supporting means 30 and the armrest base body 28 are held against one another. To this purpose, the armrest base body 28 comprises retaining regions 52 provided for effecting a retaining connection with the supporting means 30. The lateral regions 38 of the armrest base body 28 which form the lateral surface 40 to the outside, in each case comprise a projection 54 oriented inwards in a direction 43 transversely to the longitudinal direction 32, which forms a supporting surface 56 on which the supporting means 30 is supported. The supporting surface 56 faces the armrest surface 20 and is oriented parallel thereto. The projections 54 forming the supporting surface 56 extend at least over a substantial part of the entire extent of the armrest base body 28 in its longitudinal direction 32, and in each case are configured herein as retaining lips. As may also be gathered from FIG. 5, the supporting means 30 is enclosed on four sides by the armrest base body 28. The supporting means 30 and the armrest base body 28 are shaped to be adapted to one another so that the supporting means 30 and the armrest base body 28 are held against one another in a form-fit connection.

The fastening means 50 preferably serve exclusively for securing the supporting means 30 to the armrest 18. During assembly, initially the supporting means 30 is fastened to the armrest 18, and subsequently the armrest base body 28 is pushed onto the supporting means 30, wherein the form-fit connection is effected by means of the retaining regions 52. As a result, the armrest base body 28 may be easily fastened to the supporting means 30 without tools. Moreover, the armrest base body 28 may be easily removed from the supporting means 30, whereby a simple replacement of the armrest base body 28 may be carried out.

The armrest base body 28 is made of a hard material. In particular, it is produced from TPU, which contains Texin 285 and polyurethane, which has a hardness of approximately 85 Shore A and advantageous properties with regard to wear resistance. In order to provide a high degree of passenger comfort in spite of the high level of hardness of the armrest base body 28, the armrest unit 26 for a passenger seat is provided with a suspension unit 58, which is arranged underneath the armrest surface 20. In this description, the terms "top", "bottom", "above", "underneath" etc., irrespective of the position of the armrest 18 relative to the seat surface 14, refer to the normal direction of the armrest surface 20, wherein the armrest surface 20 corresponds to the "upper" side of the armrest unit 26 for a passenger seat. The suspension unit 58 is covered from the top by the armrest surface 20 and is accordingly not visible to the passenger.

The suspension unit 58 has two suspension parts 62.1, 62.2 which are arranged in the normal direction 46 between the armrest surface 20 and the supporting means 30 and/or the supporting surface 44 of the supporting means 30. The suspension parts 62 are configured to be elongate, with a longitudinal direction which corresponds to the longitudinal direction 32. They extend in the longitudinal direction 32 over at least a substantial part of the extent of the armrest base body 28 in its longitudinal direction 32 (see FIGS. 3 and 4). The suspension parts 62.1, 62.2 are oriented parallel to one another and spaced apart from one another in the direction 43 transversely to the longitudinal direction 32.

As may be gathered from FIG. 2, the supporting means 30 serves for supporting the suspension unit 58 and/or for supporting the suspension parts 62.1, 62.2 which are supported on the supporting surface 44 of the supporting means 30. A suspension part 62 thus connects a partial region 64 of the armrest base body 28 with the supporting means 30, wherein the partial region 64 forms a bottom surface 66 facing the supporting means 30. In this case, the suspension parts 62.1, 62.2 fixed to the partial region 64 are used as spacing means 68.1, 68.2 which, in the normal direction 46 relative to the armrest surface 20, form a space H between the partial region 64 and the supporting means 30.

By forming the space H, hollow spaces 70, 72.1, 72.2 are produced inside the armrest structure between the partial region 64 and the supporting means 30 by the suspension unit 58. As a result, in spite of the hardness of the material of the armrest base body 28, a flexibility which is advantageous for passenger comfort may be achieved in the region of the armrest surface 20. The hollow spaces 72 are denoted as lateral hollow spaces 72.1, 72.2. The lateral hollow spaces 72.1, 72.2 are separated from one another and/or they are spaced apart from one another in the direction 43 transversely to the longitudinal direction 32. Herein the suspension parts 62.1, 62.2 serve as separating means 74.1, 74.2, which separate the hollow spaces 72.1, 72.2 from one another in the direction 43. The lateral hollow spaces 72.1, 72.2 are arranged on both sides of the central plane 34, and are spaced apart therefrom in the direction 43. They are also arranged mirror-symmetrically relative to one another, with regard to the central plane 34, and in each case adjoin a lateral region 38.1 and/or 38.2 of the armrest base body 28. Said lateral hollow spaces 72.1, 72.2 associated in each case with a lateral region 38.1 and/or 38.2, provide comfortable damping in the region of the lateral surfaces 40 of the armrest base body 28. Between the suspension parts 62.1, 62.2 and/or the separating means 74.1, 74.2 a further central hollow space 70 is arranged. Said hollow space 70 is separated from each of the lateral hollow spaces 72.1, 72.2 by one of the separating means 74.1 and/or 74.2, and provides damping in the region of the central axis 36. Herein, relative to the direction 43, the central hollow space 70 is arranged between the lateral hollow spaces 72.1, 72.2.

The suspension parts 62.1, 62.2 in each case have a region 63.1 and/or 63.2 (see FIG. 5), which is configured as a rib protruding from the partial region 64 of the armrest base body 28. In this case, the regions 63 in each case protrude downward until coming into contact with the supporting means 30. A "downward" extent is intended, in particular, to be understood as an extent in a direction which points away from the armrest surface 20 and faces toward the supporting means 30. The regions 63.1, 63.2 configured as ribs are oriented parallel to one another in the longitudinal direction 32. In the exemplary embodiment considered, the suspension parts 62.1, 62.2 are integrally formed onto the armrest base body 28.

Figure 5:
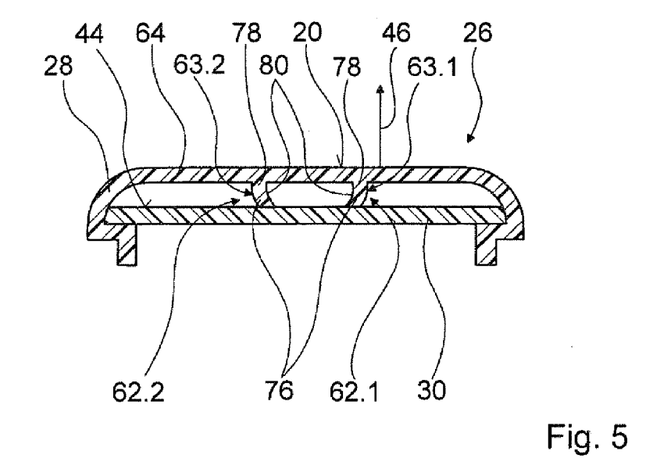
FIG. 5 is a sectional view of the armrest unit of FIG. 2.

The suspension parts 62.1, 62.2 are shown in detail in a detailed view in FIG. 5. Said detailed view shows the arrangement of FIG. 2 in a two-dimensional sectional view along a plane oriented perpendicular to the longitudinal direction 32. As may be gathered from the illustration, a region 63.1 and/or 63.2 in each case has a partial region 76 which is oriented obliquely relative to the supporting surface 44 of the supporting means 30. In a section in a plane perpendicular to the central axis 36, as is shown in FIG. 5, the oblique partial region 76 forms an angle with the supporting surface 44 and with the normal direction 46. The partial region 76 is directly adjacent to the supporting surface 44 and abuts obliquely thereon. The partial region 76 may correspond to the entire region 63.1, 63.2, wherein the entire region 63.1, 63.2 is oriented obliquely to the supporting surface 44 or, as in the exemplary embodiment considered, the oblique partial region 76 may be adjacent to a partial region 78 oriented perpendicular to the armrest surface 20 and adjacent to the partial region 64. As a result, a set bending point is implemented at an angle point at which the vertical partial region 78 merges with the oblique partial region 76.

Figure 6:
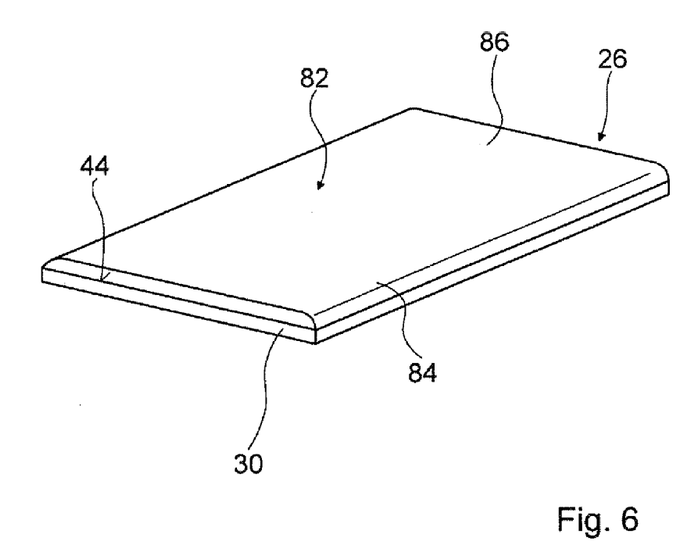
FIG. 6 is an alternative armrest unit comprising a spacer fabric and FIG. 7 is a sectional view of the armrest unit of FIG. 6.
Figure 7:
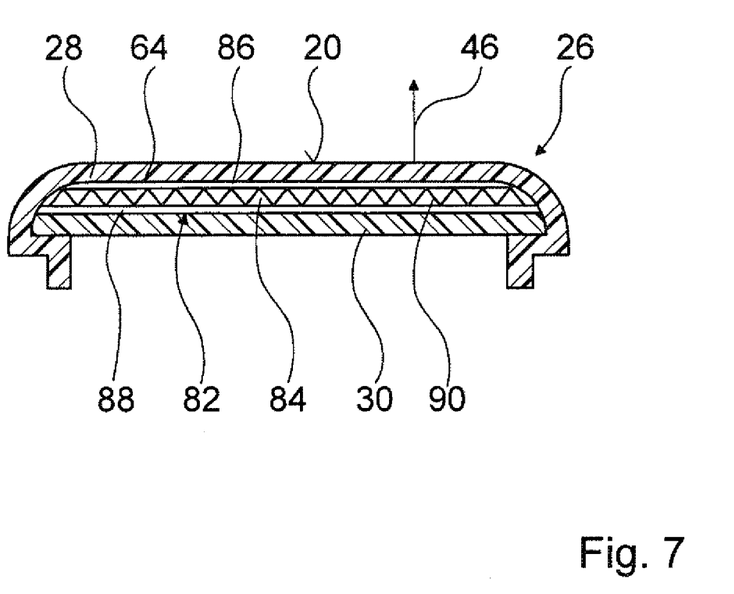

FIGS. 6 and 7 show the armrest unit 26 for a passenger seat in an alternative embodiment. To avoid unnecessary repetition, the following description is limited to the differences from the exemplary embodiment described above. Components which have the same function as in the first exemplary embodiment are denoted by the same reference numeral. Reference is made to the above description for features which are not described below.

FIG. 6 shows the armrest unit 26 for a passenger seat in a perspective view, wherein for the sake of clarity the armrest base body 28, which is identical to the exemplary embodiment in FIGS. 1 to 5, is not depicted. A suspension unit 82 is mounted to the supporting surface 44 of the supporting means 30. Said suspension unit 82 extends over a substantial part of the supporting surface 44. In particular, the supporting surface 44 is covered from the top by the suspension unit 82.

In FIG. 7, the armrest unit 26 for a passenger seat is shown in a two-dimensional sectional view along a plane oriented perpendicular to the longitudinal direction 32. The suspension unit 82 has a resilient means 84 which is produced from a fabric and is arranged in a space formed by the partial region 64 and the supporting surface 44. Herein the resilient means is supported on the supporting surface 44 of the supporting means 30, and is adjacent to the partial region 64 of the armrest base body 28. The resilient means 84 is configured as a spacer fabric. This corresponds to a dual-surfaced textile with two textile surfaces parallel to one another, wherein one textile surface 86 adjoins the partial region 64 and one textile surface 88 adjoins the supporting surface 44. The textile surfaces 86, 88 are spaced apart from one another via spacing means 90. The spacing means 90 correspond to spacing connecting threads, also known as pile threads, which are shown schematically in the figure and, for the sake of clarity, are shown enlarged. By the use of a spacer fabric, a high number of discrete spacing means which may be distinguished from one another is provided, said spacing means 90 being supported in discrete supporting regions of the textile surfaces 86, 88.

The invention claimed is:
1. An armrest unit for a passenger seat comprising
an armrest base body which forms an armrest surface,
a suspension unit which is arranged underneath the armrest surface and which has at least one suspension part which is embodied as a spacing means, and a supporting means for supporting the suspension unit,
wherein the suspension part is integrally connected to the armrest base body and forms, in the normal direction of the armrest surface, a space between the supporting means and at least one partial region of the armrest base body, and
wherein the suspension part is arranged in the normal direction between the armrest surface and the supporting means, with at least one partial region, which is oriented obliquely relative to the supporting means in a non-supporting state,
wherein at least one hollow space is formed between at least one partial region of the armrest base body and the supporting means by means of the suspension unit, and wherein
the suspension unit forms at least two hollow spaces and the suspension part is embodied as a separating means which separates the hollow spaces from one another.

2. The armrest unit for a passenger seat as claimed in claim 1, wherein the armrest base body is configured in an elongate manner with a longitudinal direction and has a central plane extending in the longitudinal direction, wherein the hollow space is arranged to the side of the central plane, and is spaced apart from the central plane.

3. The armrest unit for a passenger seat as claimed in claim 2, wherein the suspension part is spaced apart from the central plane.

4. The armrest unit for a passenger seat as claimed in claim 1, wherein the armrest base body at least substantially encloses the supporting means.

5. The armrest unit for a passenger seat as claimed in claim 4, wherein the armrest base body affixes itself to the supporting means.

6. The armrest unit for a passenger seat as claimed in claim 1, wherein the armrest base body has at least one retaining region which is provided for effecting a retaining connection with the supporting means.

7. The armrest unit for a passenger seat as claimed in claim 6, wherein the retaining region is provided for producing a form-fit connection with the supporting means.

8. The armrest unit for a passenger seat as claimed in claim 6, wherein the retaining region is located at periphery of the armrest surface.

9. The armrest unit for a passenger seat as claimed in claim 1, wherein the armrest base body is configured in an elongate manner with a longitudinal direction, and the suspension part has in the longitudinal direction an extent which is at least a substantial fraction of the extent of the armrest base body in the longitudinal direction.

10. The armrest unit for a passenger seat as claimed in claim 1, wherein the at least one suspension part has a region protruding from at least one partial region of the armrest base body.

11. The armrest unit for a passenger seat as claimed in claim 1, wherein the suspension unit has a resilient means which is produced at least from fabric.

12. The armrest unit for a passenger seat as claimed in claim 11, wherein the resilient means is configured as a spacer fabric.

13. The armrest unit for a passenger seat as claimed in claim 1, wherein the armrest base body is produced from a hard material.

14. The armrest unit for a passenger seat as claimed in claim 1, wherein the suspension part is spaced apart from the central plane, and apart from a periphery of the armrest base body.

15. The armrest unit for a passenger seat as claimed in claim 1, wherein no external force is applied on the armrest base body in the non-supporting state.

16. The armrest unit for a passenger seat as claimed in claim 1, wherein the armrest surface of the armrest base body is a substantially level plane in the non-supporting state.

17. An armrest unit for a passenger seat comprising
an armrest base body which forms an armrest surface,
a suspension unit which is arranged underneath the armrest surface and which has at least one suspension part which is embodied as a spacing means, and
a supporting means for supporting the suspension unit,
wherein the suspension part is integrally connected to the armrest base body and forms, in the normal direction of the armrest surface, a space between the supporting means and at least one partial region of the armrest base body, and
wherein the suspension part is arranged in the normal direction between the armrest surface and the supporting means, with at least one partial region, which is oriented obliquely relative to the supporting means in a non-supporting state,
wherein at least one hollow space is formed between at least one partial region of the armrest base body and the supporting means by means of the suspension unit,
wherein the armrest base body is configured in an elongate manner with a longitudinal direction and has a central plane extending in the longitudinal direction, wherein the hollow space is arranged to the side of the central plane, and is spaced apart from the central plane.

18. An armrest unit for a passenger seat comprising
an armrest base body which forms an armrest surface,
a suspension unit which is arranged underneath the armrest surface and which has at least one suspension part which is embodied as a spacing means, and
a supporting means for supporting the suspension unit,
wherein the suspension part is integrally connected to the armrest base body and forms, in the normal direction of the armrest surface, a space between the supporting means and at least one partial region of the armrest base body, and
wherein the suspension part is arranged in the normal direction between the armrest surface and the supporting means, with at least one partial region, which is oriented obliquely relative to the supporting means in a non-supporting state,
wherein the armrest base body at least substantially encloses the supporting means.

* * * * *